(12) United States Patent
Gross et al.

(10) Patent No.: US 7,941,283 B2
(45) Date of Patent: May 10, 2011

(54) DETERMINING THE FLOW RATE OF AIR IN A COMPUTER SYSTEM

(75) Inventors: Kenny C. Gross, San Diego, CA (US); Kalyanaraman Vaidyanathan, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 204 days.

(21) Appl. No.: 12/331,834

(22) Filed: Dec. 10, 2008

(65) Prior Publication Data

US 2010/0139360 A1      Jun. 10, 2010

(51) Int. Cl.
*G01K 13/00*    (2006.01)
*G06F 17/40*    (2006.01)

(52) U.S. Cl. .......... 702/45; 702/130; 702/132; 702/136; 374/137; 374/141; 374/142

(58) Field of Classification Search .......... 702/45, 702/50, 130, 132, 136
See application file for complete search history.

(56) References Cited

U.S. PATENT DOCUMENTS

| | | | |
|---|---|---|---|
| 7,096,147 B1 * | 8/2006 | Low | 702/132 |
| 7,421,368 B2 * | 9/2008 | Dalton et al. | 702/130 |
| 2007/0291817 A1 * | 12/2007 | Bradicich et al. | 374/15 |
| 2009/0067080 A1 * | 3/2009 | Gross et al. | 360/71 |

* cited by examiner

*Primary Examiner* — Hal D Wachsman
(74) *Attorney, Agent, or Firm* — Park, Vaughan, Fleming & Dowler LLP

(57) ABSTRACT

Some embodiments of the present invention provide a system that determines a flow rate of air along an airflow path in a computer system. During operation the system monitors a first temperature profile from a first temperature sensor located in a first position in the airflow path, and monitors a second temperature profile from a second temperature sensor located in a second position in the airflow path, wherein the first position is upstream in the airflow path from the second position, and wherein the first position and the second position are separated by a predetermined distance along the airflow path. Next, the system computes a cross-power spectral density based on the first temperature profile and the second temperature profile. Then, the system determines a flow rate of air in the computer system based on the cross-power spectral density.

20 Claims, 2 Drawing Sheets

DETERMINING THE FLOW RATE OF AIR IN A COMPUTER SYSTEM

BACKGROUND

1. Field

The present invention generally relates to techniques for characterizing a computer system. More specifically, the present invention relates to a method and an apparatus that determines a flow rate of air along an airflow path through a computer system.

2. Related Art

To provide sufficient cooling, designers of computer systems are often interested in the flow rate of air through a computer system, which can be measured in linear feet per minute (LFM) or in cubic feet per minute (CFM). These parameters can take a great amount of time to measure experimentally and may be difficult to compute using methods such as computational fluid dynamics modeling due to potentially complex and tortuous air flow paths in the computer system, in addition to the fact that the density of air can change as the air changes temperature while it travels through the computer system. Additionally, directly measuring LFM and CFM in the field using mechanical sensors may require periodic manual recalibration of the sensors used over a long period of time and can be impractical for large populations of servers in datacenters.

Hence, what is needed is a method and system that determines a flow rate of air through a computer system without the above-described problems.

SUMMARY

Some embodiments of the present invention provide a system that determines a flow rate of air along an airflow path in a computer system. During operation the system monitors a first temperature profile from a first temperature sensor located in a first position in the airflow path, and monitors a second temperature profile from a second temperature sensor located in a second position in the airflow path, wherein the first position is upstream in the airflow path from the second position, and wherein the first position and the second position are separated by a predetermined distance along the airflow path. Next, the system computes a cross-power spectral density based on the first temperature profile and the second temperature profile. Then, the system determines a flow rate of air in the computer system based on the cross-power spectral density.

In some embodiments, the system generates an alarm based on the flow rate of air in the computer system.

In some embodiments, determining the airflow rate includes determining a transit time based on a phase-frequency slope of the cross-power spectral density.

In some embodiments, determining the flow rate of air includes determining a cross-sectional flow area for the air flow path, and determining a cubic feet per minute flow rate based on the cross-sectional flow area and the flow rate of air.

In some embodiments, determining the flow rate includes calibrating the measurement of the flow rate by determining the flow rate of air associated with specific fan speeds in a set of computer fan speeds.

In some embodiments, calibrating the measurement of the flow rate of air includes determining a cross-sectional flow area for the air flow.

In some embodiments, while determining the flow rate the system first monitors a set of temperature profiles from a set of temperature sensors located in a set of positions in the airflow path in the computer system, wherein the positions are separated by a set of predetermined distances along the airflow path. Next, the system computes a set of cross-power spectral densities based on pairs of temperature profiles in the set of temperature profiles from pairs of temperature sensors in the set of temperature sensors. Then, the system determines the flow rate based on the set of cross-power spectral densities for each pair of temperature profiles, and the predetermined distance for each pair of temperature sensors.

In some embodiments, determining a flow rate of air in the computer system based on the cross-power spectral density includes determining an average of the cross-power spectral density over a predetermined time period.

In some embodiments, prior to computing the cross-power spectral density, the system transforms the first temperature profile into a first temperature profile frequency domain representation, and transforms the second temperature profile into a second temperature profile frequency domain representation.

In some embodiments, monitoring the first temperature profile and the second temperature profile includes systematically monitoring and recording a set of performance parameters of the computer system, wherein the recording process keeps track of the temporal relationships between events in different performance parameters.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Figure 1:
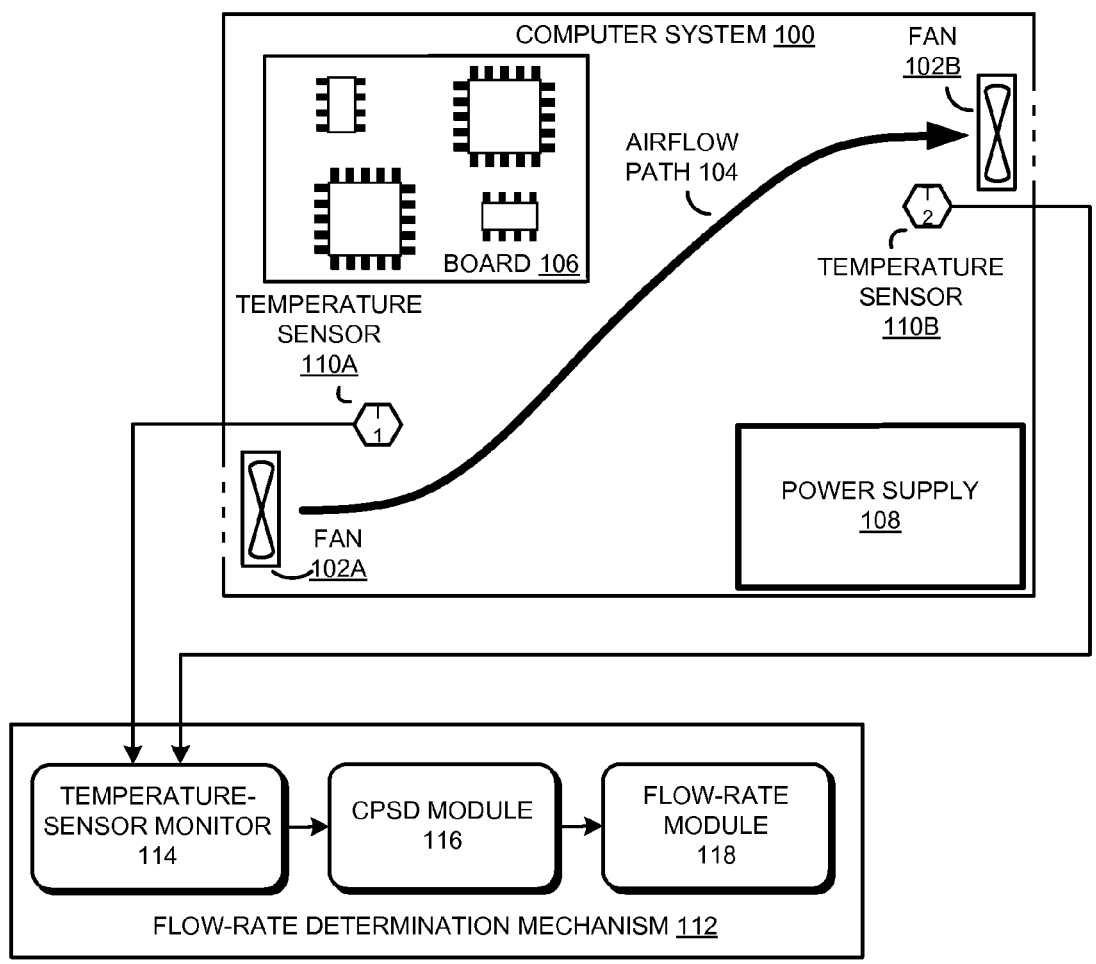
FIG. 1 represents a system that determines a flow rate of air along an airflow path in a computer system in accordance with some embodiments of the present invention.

FIG. 1 represents a system that determines a flow rate of air along an airflow path in a computer system in accordance with some embodiments of the present invention. Computer system 100 includes fan 102A and fan 102B generating air flow along airflow path 104 and between board 106 and power supply 108. Computer system 100 also includes temperature sensor 110A and temperature sensor 110B coupled to flow-rate determination mechanism 112. Furthermore, flow-rate determination mechanism 112 includes temperature-sensor monitor 114, cross-power spectral-density (CPSD) module 116 and flow-rate module 118.

Computer system 100 can include but is not limited to a server, a server blade, a datacenter server, a field-replaceable unit, an enterprise computer, or any other computation system that includes one or more processors and one or more cores in each processor.

Fan 102A and fan 102B can be any type of fan implemented in any technology that creates airflow along airflow path 104 in computer system 100. Note that in some embodiments there may be more or fewer fans in computer system 100 that create airflow along airflow path 104. Also note that board 106 and power supply 108 are depicted in computer system 100 for exemplary purposes only to represent internal structure in computer system 100 that may help shape airflow path 104. In some embodiments board 106 and/or power supply unit 108 may be removed, repositioned or replaced by other devices, subcomponents or systems in computer system 100.

Airflow path 104 depicts the flow of air in computer system 100 resulting from air flow generated by fan 102A and fan 102B inside computer system 100 around board 106 and power supply 108. Note that the particular path of airflow path 104 depicted in FIG. 1 is for exemplary purposes only and in other embodiments may take other paths through computer system 100 without departing from the present invention.

Temperature sensor 110A and temperature sensor 110B sense the temperature profile of air in airflow path 104 and are located a predetermined distance apart along airflow path 104. Temperature sensor 110A and temperature sensor 110B can include any type of temperature-sensitive sensor including but not limited to a discrete temperature-sensing device, or a temperature-sensing device integrated into a computer system component. Temperature sensor 110A and temperature sensor 110B may be mechanical, electrical, optical, or any combination thereof, and may be implemented in any technology. In some embodiments, temperature sensor 110A and temperature sensor 110B are coupled to one or more data buses in computer system 100 to enable communication of the sensed temperature data within and out of computer system 100.

Temperature-sensor monitor 114 can be any device that can monitor temperature profiles sensed by temperature sensor 110A and temperature sensor 110B. Temperature-sensor monitor 114 can be implemented in any combination of hardware and software. In some embodiments, temperature-sensor monitor 114 operates on computer system 100. In other embodiments, temperature-sensor monitor 114 operates on one or more service processors. In still other embodiments, temperature-sensor monitor 114 is located inside of computer system 100. In yet other embodiments, temperature-sensor monitor 114 operates on a separate computer system. In some embodiments, temperature-sensor monitor 114 includes a method or apparatus for monitoring and recording computer system performance parameters as set forth in U.S. Pat. No. 7,020,802, entitled "Method and Apparatus for Monitoring and Recording Computer System Performance Parameters," by Kenny C. Gross and Larry G. Votta, Jr., issued on 28 Mar. 2006, which is hereby fully incorporated by reference.

CPSD module 116 can be any device that can generate a CPSD from the monitored temperature profiles received from temperature-sensor monitor 114 in accordance with embodiments of the present invention. CPSD module 116 can be implemented in any combination of hardware and software. In some embodiments, CPSD module 116 operates on computer system 100. In other embodiments, CPSD module 116 operates on one or more service processors. In still other embodiments, CPSD module 116 is located inside of computer system 100. In yet other embodiments, CPSD module 116 operates on a separate computer system.

Flow-rate module 118 is any device that can receive input from CPSD module 116 and determine the flow rate of air along airflow path 104 in accordance with embodiments of the present invention. Flow-rate module 118 can be implemented in any combination of hardware and software. In some embodiments, flow-rate module 118 operates on computer system 100. In other embodiments, flow-rate module 118 operates on one or more service processors. In still other embodiments, flow-rate module 118 is located inside of computer system 100. In yet other embodiments, flow-rate module 118 operates on a separate computer system.

Some embodiments of the present invention operate as follows. As air flows in computer system 100 along airflow path 104, temperature sensor 110A and temperature sensor 110B sense the temperature profile of the air in airflow path 104 over time. The temperature profiles from temperature sensor 110A and temperature sensor 110B are monitored by temperature-sensor monitor 114. The monitored temperature profiles are sent to CPSD module 116. CPSD module 116 then computes the cross-power spectral density of the temperature profiles monitored by temperature sensor 110A and temperature sensor 110B.

CPSD module 116 can implement any method or apparatus to generate the CPSD without departing from the present invention. In some embodiments, CPSD module 116 transforms the temperature profiles received from temperature-sensor monitor 114 into frequency domain representations, then computes the CPSD using the frequency domain representation of the temperature profile from temperature sensor 110A and the frequency domain representation of the temperature profile from temperature sensor 110B. In some embodiments, transforming the temperature profiles from the time domain to the frequency domain involves using a Fourier transform which can include but is not limited to a discrete Fourier transform such as a fast Fourier transform (FFT). In other embodiments, other transform functions can be used, including, but not limited to, a Laplace transform, a Z-transform, and any other transform technique. In some embodiments, the CPSD is computed by generating the complex conjugate of one of the frequency domain representations of one temperature profile and multiplying it by the other frequency domain representation of the other temperature profile.

In other embodiments, the CPSD is computed by first computing the cross-correlation of the time-domain representations of the temperature profiles from temperature sensor 110A and temperature sensor 110B. Then, the CPSD is generated by computing the frequency domain representation of the cross-correlation. In some embodiments, transforming the cross-correlation from the time domain to the frequency domain involves using a Fourier transform which can include but is not limited to a discrete Fourier transform such as an FFT. In other embodiments, other transform functions can be used, including, but not limited to, a Laplace transform, a Z-transform, and any other transform technique now known or later developed.

Flow-rate module 118 then receives the CPSD from CPSD module 116. In some embodiments, flow-rate module 118 receives the product of the Fourier transform of one temperature profile multiplied by the complex conjugate of the Fourier transform of the other temperature profile. Flow-rate module 118 then determines the slope of the CPSD phase (in degrees) versus frequency (in hertz). The transit time in seconds for the air flow from temperature sensor 110A to temperature sensor 110B is then determined by dividing the slope of the CPSD phase vs. frequency by 360 degrees. The LFM is then determined by dividing the predetermined distance between temperature sensor 110A and temperature sensor 110B by the transit time. The CFM is then determined by multiplying the LFM by a cross-sectional area for computer system 100.

For example, in some embodiments, a time-series of temperature measurements (a temperature profile) monitored by temperature-sensor monitor 114 from temperature sensor 110A is fast Fourier transformed by CPSD module 116. Additionally a time-series of temperature measurements (a temperature profile) monitored by temperature-sensor monitor 114 from temperature sensor 110B is fast Fourier transformed and the complex conjugate is generated by CPSD module 116. The CPSD is then generated by CPSD module 116 by multiplying the FFT of the temperature profile from temperature sensor 110A by the complex conjugate of the FFT of temperature profile from temperature sensor 110B. The resulting CPSD can be represented as a magnitude portion that is a function of frequency and a phase portion that is a function of frequency. The phase portion of the CPSD can be represented as a phase angle in degrees versus frequency in hertz which has a slope in degrees/hertz (degrees·seconds). The slope is then divided by 360 degrees to generate the transit time in seconds for the air flow from temperature sensor 110A to temperature sensor 110B. Then, the LFM is determined by dividing the predetermined distance between temperature sensor 110A and temperature sensor 110B by the transit time, and the CFM is determined by multiplying the LFM by the cross-sectional area for computer system 100.

Note that the predetermined distance between temperature sensor 110A and temperature sensor 110B, and/or the cross-sectional area of computer system 100 can be determined by analysis of the design of computer system 100, during calibration testing of computer system 100, or by any other suitable method. For example, during calibration testing of computer system 100 prior to putting computer system 100 in the field, the predetermined distance between temperature sensor 110A and temperature sensor 110B, and/or the cross-sectional area of computer system 100 can be determined using air-flow meters to measure the LFM and CFM and the above process to determine the transit time. The predetermined distance between temperature sensor 110A and temperature sensor 110B can be determined by multiplying the measured LFM by the transit time, and the cross-sectional area can be determined by dividing the measured CFM by the measured LFM. Additionally, in some embodiments during the calibration period, the LFM and CFM are determined for a set of speeds for fan 102A and fan 102B. In these embodiments, flow-rate determination mechanism 112 monitors the speed of fan 102A and the speed of fan 102B. The predetermined distance and area as a function of fan speeds of fan 102A and fan 102B are then used by flow-rate module 118 to determine the LFM and CFM during operation of flow-rate determination mechanism 112.

In some embodiments, flow-rate module 118 generates an alarm based on the determined flow rate of air along airflow path 104. For example, in some embodiments, flow-rate module 118 receives information from computer system 100 related to the fan speeds of fan 102A and fan 102B. Flow-rate module 118 then generates an alarm if the LFM determined by flow-rate module 118 falls below a predetermined value. The predetermined value may be determined based information including but not limited to one or more of: a minimum LFM considered safe for computer system 100, or an LFM that departs by a fix amount or percentage from the LFM measured during the calibration period discussed above based on the monitored fan speeds. Note that in some embodiments the alarm generated by flow-rate module 118 can include but is not limited to one or more of the following: generating a maintenance request, or generating a notification (such as an automated email, telephone call, page, turning on a light, or generating a sound).

In some embodiments, flow-rate module 118 averages the CPSDs received from CPSD module 116 over a predetermined time period prior to determining the LFM or CFM using the above processes. In some embodiments, the predetermined time period is determined based on information including but not limited to one or more of: the rate at which temperature profiles are monitored by temperature-sensor monitor 114, the rate at which the speed of fan 102A and/or fan 102B is changed, or the rate of change of any other thermal process in computer system 100.

In some embodiments fan 102A and fan 102B are replaced by a set of fans in airflow path 104 in computer system 100. Temperature-sensor monitor 114 monitors the temperature profile from fans in the set of fans. CPSD module 116 then determines the CPSD for temperature profiles from pairs of temperature sensors in the set of temperature sensors using one or more techniques as described above. Flow-rate module 118 then determines the transit time for each pair of temperature sensors using techniques described above. The LFM is then determined based on the predetermined distance between each pair of temperature sensors, and the CFM is determined from the LFM based on the cross-sectional area determined for the air flow between the pairs of temperature sensors. Note that as described above, the predetermined distance and cross-sectional area between each pair of temperature sensors in the pair of temperature sensors can be determined as described above based on techniques including but not limited to directly computing the predetermined distance and effective cross-sectional area, or determining them using measurements from a calibration period in which the LFM and CFM are directly measured.

Figure 2:
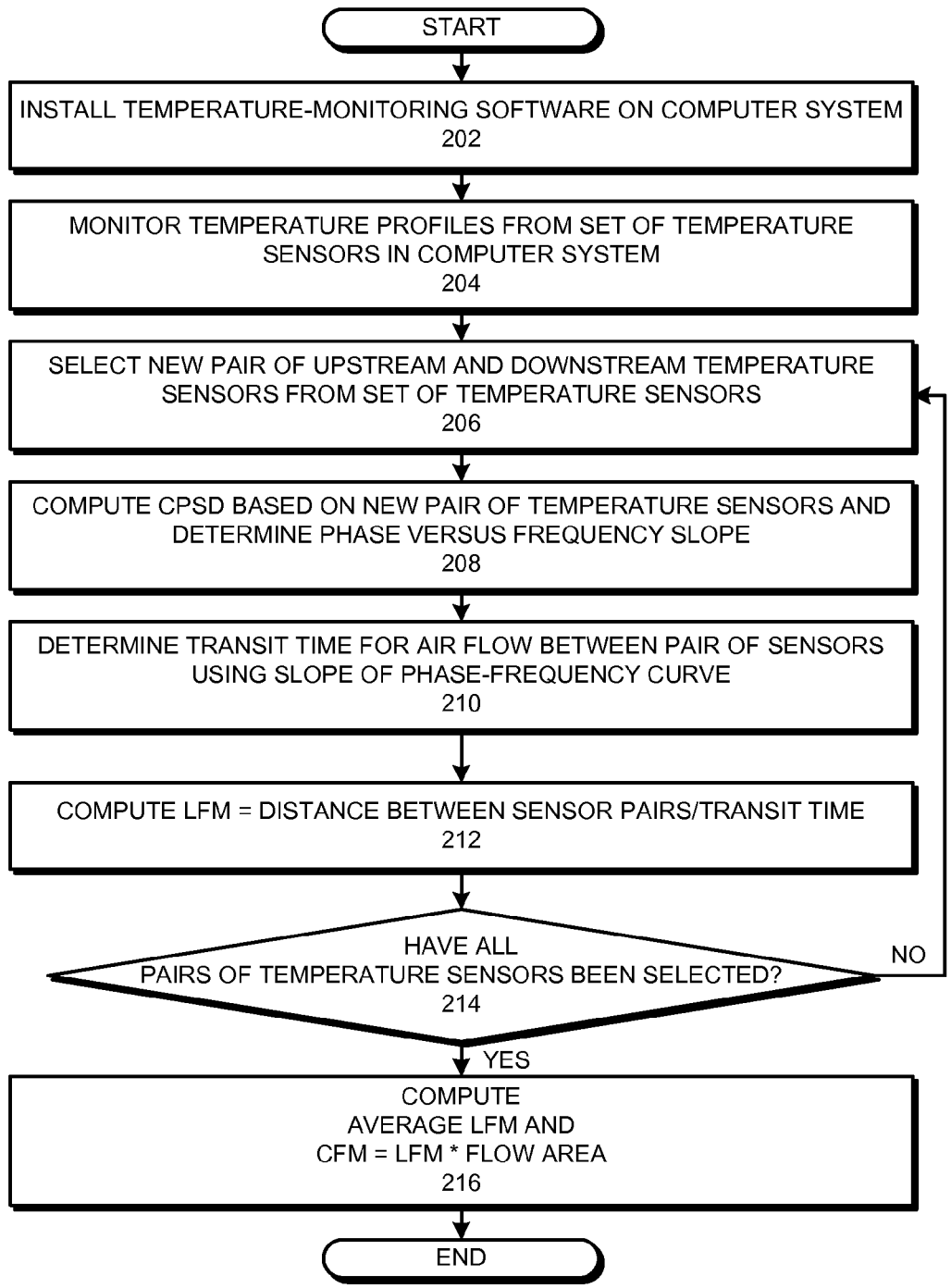
FIG. 2 presents a flow chart illustrating a process that determines a flow rate of air along an airflow path in a computer system in accordance with some embodiments of the present invention.

FIG. 2 presents a flow chart illustrating a process that determines a flow-rate of air along an airflow path in a computer system in accordance with some embodiments of the present invention. First, temperature-monitoring software is installed on the computer system (step 202). Note that the computer system contains a set of temperature sensors in the airflow path being measured. Then, temperature profiles are monitored from each temperature sensor in the set of temperature sensors (step 204). Next, a pair of temperature sensors in the set of temperature sensors is selected that has not yet been selected (step 206). The CPSD of the temperature profiles from the two selected temperature sensors is determined as described above, and the slope of the phase versus frequency for the CPSD is determined (step 208). The transit time is then determined using the slope as discussed above (step 210). For example, if the slope of the phase in degrees versus the frequency in hertz of the CPSD is determined, the transit time in seconds is the slope divided by 360 degrees.

Next, the LFM is computed from the transit time by dividing the distance between the pair of temperature sensors by the transit time (step 212). In some embodiments, the distance between sensors is determined by direct measurement. In other embodiments, the distance is determined based on a calibration period during which the LFM is directly measured and the transit time is measured as describe above. The distance between the sensors is then determined by multiplying the LFM by the transit time. Note that during the calibration period, measurements may be taken for a range of fan speeds including a range from a zero fan speed to the maximum fan speed in order to determine the distance between the sensors.

Then, if all pairs of temperature sensors have not yet been selected and an LFM computed for each pair (step 214), the process returns to step 206. If all pairs of temperature sensors have been selected and an LFM has been computed for each pair (step 214), then the average LFM is determined by computing the average of the LFMs computed for each pair of temperature sensors in the set of temperature sensors (step 216). The CFM is determined by multiplying the LFM by the flow area (step 216). In some embodiments, the flow area is determined by direct measurement. In other embodiments, the flow area is determined based on a calibration period during which the CFM and LFM are directly measured and flow area is determined by dividing the CFM by the LFM. Note that during the calibration period, measurements may be taken for a range of fan speeds including a range from a zero fan speed to the maximum fan speed in order to determine the flow area as a function of fan speed.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for using a computer to determine a flow rate of air along an airflow path in a computer system, the method comprising:
   monitoring a first temperature profile from a first temperature sensor located in a first position in the airflow path in the computer system;
   monitoring a second temperature profile from a second temperature sensor located in a second position in the airflow path in the computer system, wherein the first position is upstream in the airflow path from the second position, and wherein the first position and the second position are separated by a predetermined distance along the airflow path;
   computing a cross-power spectral density based on the first temperature profile and the second temperature profile;
   determining a flow rate of air in the computer system based on the cross-power spectral density; and
   generating an alarm based on the flow rate of air in the computer system.

2. The method of claim 1, wherein:
   determining the airflow rate includes determining a transit time based on a phase-frequency slope of the cross-power spectral density.

3. The method of claim 1, wherein determining the flow rate of air includes:
   determining a cross-sectional flow area for the air flow path; and
   determining a volume per minute flow rate based on the cross-sectional flow area and the flow rate of air.

4. The method of claim 1, wherein determining the flow rate includes calibrating the determination of the flow rate by determining the flow rate of air in the computer system associated with specific fan speeds in a set of computer fan speeds.

5. The method of claim 4, wherein calibrating the determination of the flow rate of air in the computer system includes determining a cross-sectional flow area for the airflow.

6. The method of claim 1,
   wherein monitoring the first and second temperature profiles includes monitoring a set of temperature profiles from a set of temperature sensors located in a set of positions in the airflow path in the computer system, wherein positions in the set of positions are separated by a set of predetermined distances along the airflow path;
   wherein computing the cross-power spectral density includes computing a set of cross-power spectral densities based on pairs of temperature profiles in the set of temperature profiles from pairs of temperature sensors in the set of temperature sensors; and
   wherein determining the flow rate includes determining the flow rate based on the set of cross-power spectral densities for each pair of temperature profiles, and the predetermined distance for each pair of temperature sensors.

7. The method of claim 1, wherein determining the flow rate of air in the computer system based on the cross-power spectral density includes determining an average of the cross-power spectral density over a predetermined time period.

8. The method of claim 1, wherein prior to computing the cross-power spectral density, the method further comprises transforming the first temperature profile into a first temperature profile frequency domain representation, and transforming the second temperature profile into a second temperature profile frequency domain representation.

9. The method of claim 1,
   wherein monitoring the first temperature profile and the second temperature profile includes systematically monitoring and recording a set of temperature profiles of the computer system; and
   wherein the recording process keeps track of the temporal relationships between events in different temperature profiles.

10. A non-transitory computer-readable storage medium storing instructions that when executed by a computer cause the computer to perform a method for determining a flow rate of air along an airflow path in a computer system, the method comprising:
    monitoring a first temperature profile from a first temperature sensor located in a first position in the airflow path in the computer system;
    monitoring a second temperature profile from a second temperature sensor located in a second position in the airflow path in the computer system, wherein the first position is upstream in the airflow path from the second position, and wherein the first position and the second position are separated by a predetermined distance along the airflow path;
    computing a cross-power spectral density based on the first temperature profile and the second temperature profile;
    determining a flow rate of air in the computer system based on the cross-power spectral density; and generating an alarm based on the flow rate of air in the computer system.

11. The computer-readable storage medium of claim 10, wherein determining the airflow rate includes determining a transit time based on a phase-frequency slope of the cross-power spectral density.

12. The computer-readable storage medium of claim 10, wherein determining the flow rate of air includes:
  determining a cross-sectional flow area for the air flow path; and
  determining a volume per minute flow rate based on the cross-sectional flow area and the flow rate of air.

13. The computer-readable storage medium of claim 10, wherein determining the flow rate includes calibrating the determination of the flow rate by determining the flow rate of air in the computer system associated with specific fan speeds in a set of computer fan speeds.

14. The computer-readable storage medium of claim 13, wherein calibrating the determination of the flow rate of air in the computer system includes determining a cross-sectional flow area for the airflow.

15. The computer-readable storage medium of claim 10,
  wherein monitoring the first and second temperature profiles includes monitoring a set of temperature profiles from a set of temperature sensors located in a set of positions in the airflow path in the computer system, wherein positions in the set of positions are separated by a set of predetermined distances along the airflow path;
  wherein computing the cross-power spectral density includes computing a set of cross-power spectral densities based on pairs of temperature profiles in the set of temperature profiles from pairs of temperature sensors in the set of temperature sensors; and
  wherein determining the flow rate includes determining the flow rate based on the set of cross-power spectral densities for each pair of temperature profiles, and the predetermined distance for each pair of temperature sensors.

16. The computer-readable storage medium of claim 10, wherein determining the flow rate of air in the computer system based on the cross-power spectral density includes determining an average of the cross-power spectral density over a predetermined time period.

17. The computer-readable storage medium of claim 10, wherein prior to computing the cross-power spectral density, the method further comprises transforming the first temperature profile into a first temperature profile frequency domain representation, and transforming the second temperature profile into a second temperature profile frequency domain representation.

18. The computer-readable storage medium of claim 10,
  wherein monitoring the first temperature profile and the second temperature profile includes systematically monitoring and recording a set of temperature profiles of the computer system; and
  wherein the recording process keeps track of the temporal relationships between events in different temperature profiles.

19. An apparatus that determines a flow rate of air along an airflow path in a computer system, the apparatus comprising:
  a first temperature sensor located in a first position in the airflow path in the computer system;
  a second temperature sensor located in a second position in the airflow path in the computer system, wherein the first position is upstream in the airflow path from the second position, and wherein the first position and the second position are separated by a predetermined distance along the airflow path;
  a monitoring device configured to monitor a first temperature profile from the first temperature sensor and a second temperature profile from the second temperature sensor;
  a computing mechanism configured to compute a cross-power spectral density based on the first temperature profile and the second temperature profile; and
  a determining mechanism configured to determine a flow rate of air in the computer system based on the cross-power spectral density.

20. The apparatus of claim 19,
  wherein the monitoring device includes a device configured to systematically monitor and record a set temperature profiles of the computer system; and
  wherein the recording process keeps track of the temporal relationships between events in different temperature profiles.

* * * * *